(12) United States Patent
Julien et al.

(10) Patent No.: US 7,724,776 B2
(45) Date of Patent: May 25, 2010

(54) METHOD AND INGRESS NODE FOR HANDLING FRAGMENTED DATAGRAMS IN AN IP NETWORK

(75) Inventors: Martin Julien, Laval (CA); Per Andersson, Montreal (CA); Benoit Tremblay, Laval (CA)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 322 days.

(21) Appl. No.: 11/928,916

(22) Filed: Oct. 30, 2007

(65) Prior Publication Data
US 2009/0110003 A1   Apr. 30, 2009

(51) Int. Cl.
*H04J 3/00* (2006.01)
(52) U.S. Cl. ....................................... 370/476
(58) Field of Classification Search ................. 370/389, 370/392, 394, 474, 471, 476, 229, 230, 252, 370/393
See application file for complete search history.

(56) References Cited

U.S. PATENT DOCUMENTS 6,381,242 B1 *  4/2002  Maher et al. ................. 370/394
6,453,357 B1 *  9/2002  Crow et al. .................. 709/236
2003/0039249 A1   2/2003  Basso et al.
2004/0210669 A1 * 10/2004  Lee ............................. 709/236
2005/0286517 A1  12/2005  Babbar et al.
2006/0262808 A1 * 11/2006  Lin et al. ..................... 370/466

FOREIGN PATENT DOCUMENTS

EP   1109373 B1   12/2005

OTHER PUBLICATIONS

PCT Search Report from corresponding application PCT/IB2008/054075.
Internet Protocol, Darpa Internet Program Protocol Specification, RFC 791, Sep. 1981.
Resolve IP Fragmentation, MTU, MSS, and PMTUD Issues with GRE and IPSEC, Document ID 25885, Cisco, Oct. 2, 2006.

* cited by examiner

*Primary Examiner*—Kwang B Yao
*Assistant Examiner*—Anh Ngoc Nguyen
(74) *Attorney, Agent, or Firm*—Alex Nicolaescu; Ericsson Canada Inc.

(57) ABSTRACT

Problems caused by Internet Protocol datagram fragmentation are solved by creating a session context for the datagram fragments without actually reassembling the datagram from its fragments. The session context enables treatment of the datagram without actually reassembling it. Processing fragments can be followed by forwarding the processed fragments to another node that can further fragment the IP datagram.

18 Claims, 5 Drawing Sheets

METHOD AND INGRESS NODE FOR HANDLING FRAGMENTED DATAGRAMS IN AN IP NETWORK

BACKGROUND OF THE INVENTION

1. Field of the Invention

This invention relates to digital communication systems, and more particularly to packet-switched communication systems.

2. Description of the Related Art

Request for Comment (RFC) 791, Internet Protocol (September 1981), and other RFCs define the Internet Protocol (IP) that is used for packet-switched communication networks. Information to be transmitted is divided into digital data blocks called datagrams, each of which has a header that includes the addresses of the sender (source) and intended receiver (destination), among other items of information. IP modules in the sender and receiver use the addresses to direct datagrams toward their destinations. In general, an IP module is a software program that is executed by a suitable electronic processor.

An IP datagram can be fragmented, which is to say the datagram can be split into several smaller packets, or fragments, when the network allows only smaller chunks of data to travel through the network. The several fragments that are the parts of an original datagram are sent separately through the network and have to be reassembled at their destination, reconstructing the original datagram.

Information located in communication protocol layers above the IP layer, such as the source and destination port addresses, is sometimes used to identify a unique context of an original IP datagram. Such information is not available in all fragments of the datagram, and thus the context of the original datagram cannot be recognized immediately from fragments formed by standard IP fragmentation mechanisms.

Sections 1.4, 2.3, and 3.2 of RFC 791 describe fragmentation and how fragments are identified and reassembled into an original datagram using data fields in the packet headers. Datagrams are typically fragmented by IP modules in gateways and reassembled at destination IP modules in destination IP hosts (e.g., computers), although other arrangements are permitted within networks and by agreement.

FIG. 1 depicts the format of an IP packet header according to IP version 4 (IPv4) described in Section 3.1 of RFC 791. As shown, the header includes six groups, or words, of 32 bits each that are transmitted last-bit first. Each 32-bit word includes one or more fields of digital information that identifies the packet with which the header is associated. The fields in an IPv4 header include Version, Type of Service, Total Length, Identification (ID), Flags, Fragment Offset, Time to Live (TtL), Protocol, Header Checksum, Source and Destination Addresses, and Options. The Options field has a variable length up to 40 bytes, and padding to the 32-bit word length may be provided.

After the header, which cannot be fragmented, an IPv4 packet includes a variable-length data (payload) field, which can be fragmented. Information in the fragmentable part of a datagram can include the source and destination ports and information according to another protocol. For example, an Authentication Header (AH) or Encapsulating Security Payload (ESP) protocol packet may carry encrypted Transmission Control Protocol (TCP) or User Datagram Protocol (UDP) traffic.

The ID, Flags, and Fragment Offset fields in an IPv4 packet header are used for identifying datagram fragments. According to RFC 791, the 16-bit ID field is assigned by the sender to aid in reassembling an original datagram from fragments. Of the 3-bit Flags field, bit 0 must be zero, bit 1 is a "don't fragment" flag, and bit 2 is a "more fragments" flag. If bit 1 is 0, then the datagram may be fragmented if necessary, and if bit 1 is 1, then the datagram shall not be fragmented. If bit 2 is 0, then this packet is the last fragment, and if bit 2 is 1, then there are more fragments. The 13-bit Fragment Offset field indicates where in the datagram this fragment belongs. The fragment offset is measured, i.e., fragments are counted, in units of 8 octets (64 bits), and the first fragment has offset zero. Thus, 8192 fragments of 8 octets each are permitted by IPv4, and an unfragmented datagram has bit 2=0 in the Flags field and Fragment Offset=0.

Even when IPv4 packets that are fragments of an original datagram arrive out of order, the information in the header of every packet enables fragments to be identified. By using bit 2 of the Flags field, it is possible to know whether or not more fragments are expected for the current datagram. If there are more fragments to come, then the current packet is considered a fragment; if there are no more fragments to come, but the Fragment Offset is not 0, then the current packet is considered the last fragment of a larger (unfragmented) datagram.

Section 3.2 of RFC 791 describes a datagram reassembly procedure that is performed only at the final destination with allocated reassembly resources, including a data buffer, a header buffer, a fragment block bit table, a total data length field, and a timer. The data from a fragment is placed in the data buffer according to its fragment offset and length, and bits are set in the fragment block bit table corresponding to the fragment blocks received. For each datagram, a buffer identifier is computed as the concatenation of the Source and Destination address, Protocol, and ID fields.

IP version 6 (IPv6) uses 64-bit words in headers that are arranged in a manner similar to IPv4. FIG. 2A depicts the format of an IPv6 packet header in 32-bit words. The fields in an IPv6 header include Version, Traffic Class, Flow Label, Payload Length, Next Header, Hop Limit, and Source and Destination IP Addresses. After the header, an IPv6 packet includes a variable-length data (payload) field, which can be fragmented and includes source and destination ports. The IPv6 header is simpler than the IPv4 header in that it has a fixed size with no variable-size Options field, and no fragmentation information, if any.

The fragmentation information that may be carried by the IPv4 Options field is handled in IPv6 as "option" headers that are chained through the use of the Next Header field. FIG. 2B depicts the IPv6 header format of a fragment, including an 8-bit Next Header field, an 8-bit Reserved field, a 13-bit Fragment Offset field, a 2-bit Reserved field, a 1-bit More Fragments field, and 32-bit Identification field. The fragmentation header is always the last of the "unfragmentable" headers (in IPv4, the 20-60 byte IP header is the unfragmentable header). This makes for one of the differences between IPv4 and IPv6: it is not always possible from an IPv6 header to see what the payload protocol is. The Next Header field has the identification of the next "option" header, which can be a payload protocol value, such as "UDP", "TCP", "AH", or "ESP", if there are no other options before the UDP, TCP, AS or ESP packets.

The essence of the datagram fragmentation mechanism in IPv6 is more or less the same as IPv4. An unfragmentable part of the datagram stays more or less intact (only the fragmentation information changes), and a fragmentable part of the datagram is broken up and sent as a number of fragments. The Fragment Offset is zero in the first fragment, and all fragments except the last have a "more fragments" flag set. This results in four types of packets, from a fragmentation point of view, in both IPv4 and IPv6: unfragmented; initial fragment; non-initial fragment, more-fragments flag set; and non-initial fragment, more-fragments flag not set (i.e., the last fragment) In IPv4, a packet's type can be determined from the packets header. In IPv6, a packet must be scanned for either a fragment header or a header that is part of the "fragmentable part" in order to know if the packet is a fragment or not.

U.S. Patent Application No. US 2006/0262808 by Lin et al. states that it describes a flow-through architecture for fragmentation and reassembly of tunnel packets in network devices, including a hardware pipeline without typical store-and-forward operations. Incoming fragmented packets are reassembled.

"Resolve IP Fragmentation, MTU, MSS, and PMTUD Issues with GRE and IPSEC", Document ID 25885, Cisco (Oct. 2, 2006), which is available at http://www.cisco.com/warp/public/105/pmtud_ipfrag.html, also describes datagram reassembly from fragments, and notes that fragmentation increases receiver overhead because the receiver must allocate memory for arriving fragments and combine them into a datagram after all fragments are received.

As noted above, other problems with typical IP datagram fragmentation and reassembly involve difficulty in recognizing the context of an unfragmented datagram when information identifying the context is not available in all fragments of the datagram.

SUMMARY OF THE INVENTION

In accordance with aspects of this invention, there is provided a method of handling datagram fragments in a stream of packets. The method includes the steps of determining whether a packet is a fragment based on information in the packets header; if the packet is a fragment, determining whether a session context for the fragment exists based on information in the packets header, and if the session context does not exist, determining whether the packet is an initial fragment of a datagram; if the packet is an initial fragment, creating a session context for the packet and other fragments based on information in the packet, and handling the packet according to the session context; if the packet is not an initial fragment, delaying the packet at least until the session context has been created; and if the session context exists, handling the packet according to the session context. A delayed packet is handled according to the session context after the session context has been created.

In accordance with further aspects of this invention, there is provided an apparatus for handling datagram fragments in a stream of packets. The apparatus includes an electronic processor configured to determine whether a packet is a fragment based on information in the packet's header; to determine, if the packet is a fragment, whether a session context for the fragment exists based on information in the packet's header; to determine, if the session context does not exist, whether the packet is an initial fragment of a datagram; to create, if the packet is an initial fragment, a session context for the packet and other fragments based on information in the packet; to delay the packet if the packet is not an initial fragment at least until the session context has been created; and to handle the packet according to the session context. The processor is configured to handle a delayed packet according to the session context after the session context has been created.

In accordance with further aspects of this invention, there is provided a computer-readable medium having stored instructions that, when executed by a computer, cause the computer to perform a method of handling datagram fragments in a stream of packets. The method includes the steps of determining whether a packet is a fragment based on information in the packet's header; if the packet is a fragment, determining whether a session context for the fragment exists based on information in the packets header; if the session context does not exist, determining whether the packet is an initial fragment of a datagram, and if the packet is an initial fragment, creating a session context for the packet and other fragments based on information in the packet, and handling the packet according to the session context; if the packet is not an initial fragment, delaying the packet at least until the session context has been created; and if the session context exists, handling the packet according to the session context. A delayed packet is handled according to the session context after the session context has been created.

BRIEF DESCRIPTION OF THE DRAWINGS

The various features, objects, and advantages of this invention will be understood by reading this description in conjunction with the drawings, in which.

DETAILED DESCRIPTION

Figure 1:
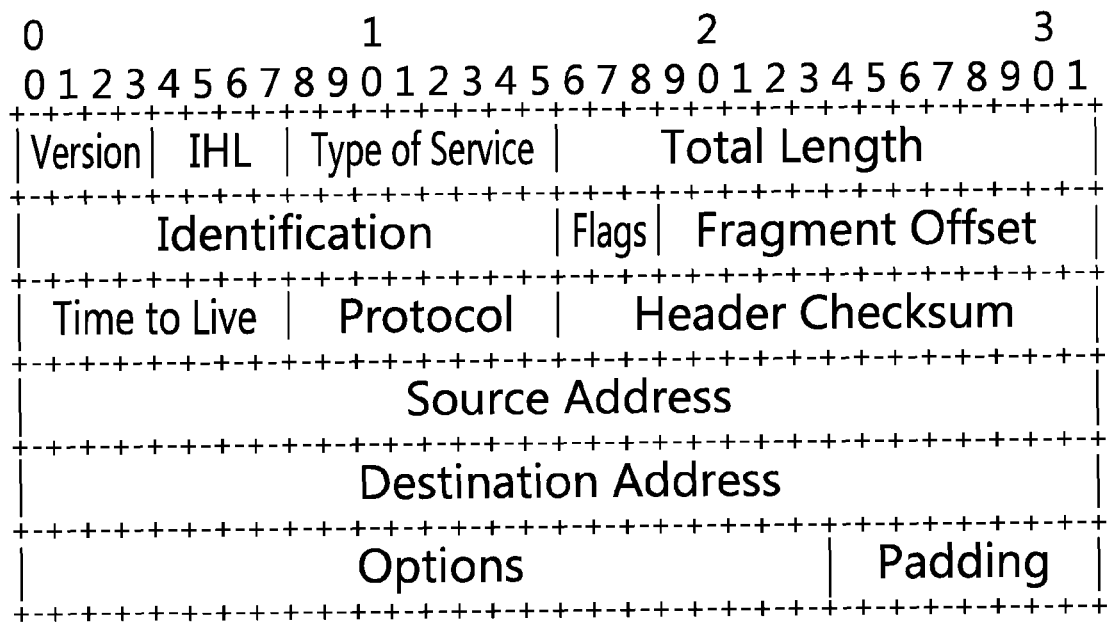
FIG. 1 depicts a header of a packet according to Internet Protocol version 4.
Figure 2A:
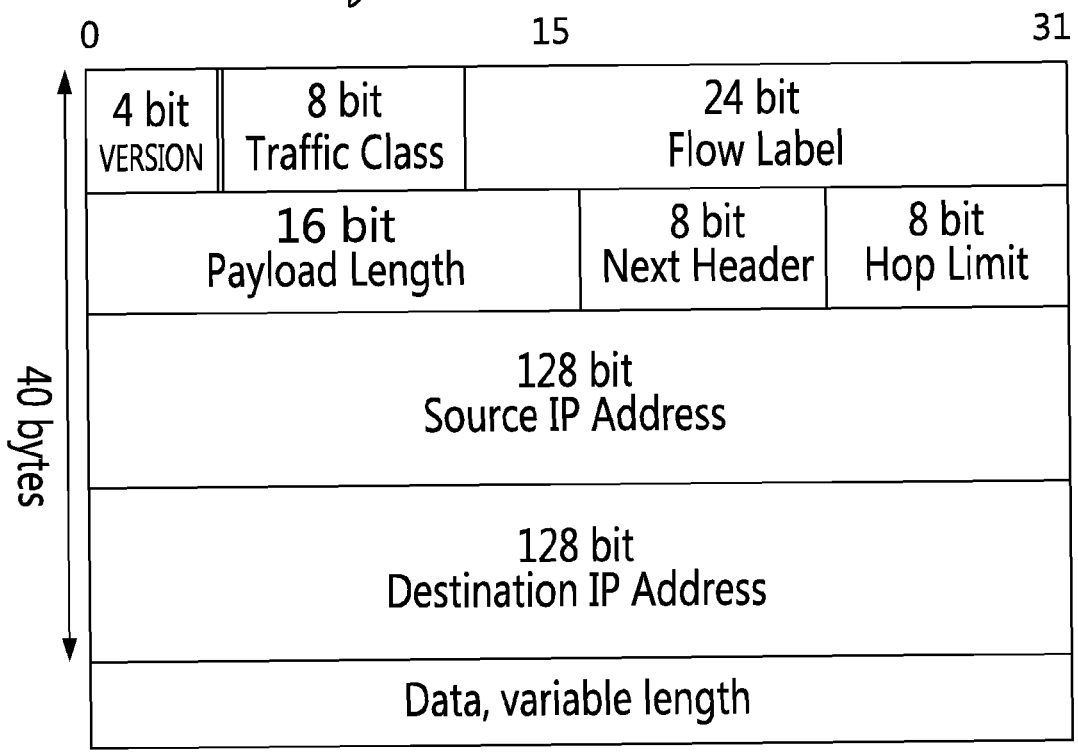
FIGS. 2A and 2B depict packet headers according to Internet Protocol version 6.
Figure 2B:
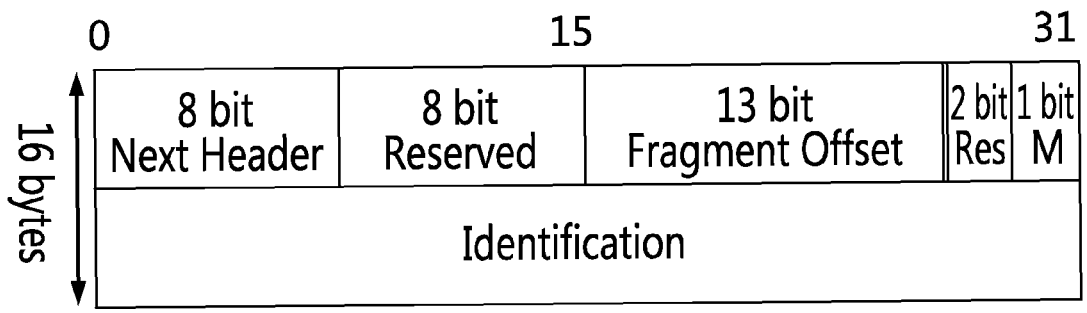

The inventors have recognized that problems caused by IP datagram fragmentation according to IPv4 and IPv6 can be solved by creating a session context for the datagram fragments without actually reassembling the datagram from its fragments. At most, the datagram may be partially reassembled only temporarily. The session context enables treatment of the whole original IP datagram without actually reassembling it. Processing fragments can be followed by forwarding the processed fragments to another node that can further fragment the IP datagram.

Processing the fragments may include buffering, i.e., a waiting period for all fragments of an original datagram to be received and processed. Although fragments may be received out of order, the session context may be created as soon as the first fragment of a datagram has been received. The session then processes the fragments until the last fragment has been processed, and then the session disappears. The fragment processing is equivalent to the processing that could be done on a fully reassembled datagram, but the datagram is not actually reassembled for processing.

Processing the fragments may also exclude buffering. One or more received packets can be passed back and forth between a forwarding plane and a control plane, i.e., a functional unit, that handles the session until the first suitable fragment is received that enables the session to be created.

In this way, the context of an unfragmented datagram can be recognized even when the usual information identifying the context is not available in all fragments of the datagram. This is important in a number of applications involving IPv4 traffic that needs to be trapped for processing for Action Condition List (ACL) or for packet filtering, such as IP Service Flows and any other IP packet processing function that requires IP packet inspection on fragments.

IP Service Flows enable identifying and treating data traffic in different ways based on packet inspection. In general, an IP Service Flow specifies a way of providing multiple services, from the same service provider to the same user IP address, that have service-specific quality of service (QoS) characteristics. Each service can also specify different Flows, each allowing for Flow-specific QoS characteristics. An IP Service Flow can be associated with service control procedures using various protocols, such as SIP, H.323, etc. ACL is commonly used to specify an action based on the reception/sending of packets matching criteria based on the interface, the source and destination IP addresses, protocol, priority, etc. The action can be to mirror, discard, forward on interface, forward to a service (e.g., encryption), etc.

The inventors have recognized that arrived fragments can overwrite each other at a receiver, based on the Fragment Offset field. Such overwriting enables an arriving fragment to open, or create, a context using a destination port allowed on a firewall that supports fragments, and modify that destination port once on the receiver, by overwriting that destination port when re-assembling the datagram in the receiver.

Thus, rather than reassembling fragments into the original datagram, a session context is created based on information in an arriving fragment. That session enables other fragments to be processed (in that session) even if some information contained in the fragment that initiated the session is not available in other fragments. Moreover, fragments can be processed and forwarded as soon as the session-initiating fragment has been handled (i.e., as soon as the session context has been created); there is no need to wait until all fragments are received.

It can be noted that, for protection, the information required for session initiation can be always in the first eight bytes of data (i.e., Fragment Offset=0) so that if two fragments with Fragment Offset=0 are received for the same session, then the session can be marked invalid and any further fragments in that session can be dropped.

Fragment Offset values and lengths can be used to specify where in a data buffer the respective fragments are located. In IPv4, Layer 4 (L4) information is always part of the first fragment, and so most implementations can use this information to "classify" the packet and permit it through a firewall. It will be appreciated, however, that it is possible to fabricate a "malicious" fragment that is not an initial fragment but that also has Fragment Offset=0, and such a fragment would then overwrite the L4 header when the datagram is reassembled. This is a common trick used to get through simple firewalls and network address translation (NAT) devices, and it is not uncommon always to let non-initial fragments through and apply any applicable policies on only the initial fragment. Simple heuristics can be used to avoid obvious uses of this sort of attack. For IPv6, the situation is a little different in that the L4 data can be harder to find, but the L4 data should still be part of the initial fragment.

Out-of-order fragments can be delayed by a functional unit such as the reassembly engine, instead of being queued in the reassembly session context, and then re-injected into the ingress process. Handling by the reassembly engine adds some latency to out-of-order fragments, thereby enabling fragments that arrive later but should be handled earlier to be processed and forwarded. Such looping is used until the arrival of a fragment that has information suitable for initiating the session context.

Thus, it will be appreciated that, among other things, this invention solves the problem of how to handle datagram fragments in a good way when there are packet "routing" policies or rules that use information that is not part of a non-initial fragment by providing one valid path for the fragments to reach the ingress side of a device, even when fragments arrive out of order as they usually do.

Common routing policies or rules filters look at "IP type" and VLAN information in a Layer 2 (L2) header; Source Address, Destination Address, and L4 protocol in a Layer 3 (L3) header; and in an L4 header, Source Port and Destination Port for SCTP, TCP, and UDP packets and SPI for AH and ESP packets. It will be recognized that TCP connections, for example, can be defined by a 5-tuple that includes the Source and Destination IP Addresses, the Source and Destination Port numbers, and an identification of the protocol that applies to a packet. Packets moving in the same direction of a connection, e.g., from the same Source Address to the same Destination Address, are in the same flow.

Because there is not much that can be done about missing fragments, detecting missing fragments can be deferred until the datagram is reassembled at the end point. In addition, the last fragment is not handled in any special way due to the risk of package loss and reordering.

The initial fragment needs to be received in order to know what to do with the rest of the fragments. A mechanism is provided that temporarily buffers, or stores, non-initial fragments, until the respective initial fragment is received. The initial fragments header information is temporarily cached, or stored, which enables one or more stored and later-arriving non-initial fragments corresponding to the same datagram to be handled correctly. It is currently believed to be preferable to temporarily buffer fragments, which helps reduce out-of-order delivery and datagram fragmentation to as few places as possible in a node or controlled network.

Information absent from non-initial fragments other than the initial, session-initiating fragment can be added to those fragments through a payload extension header, thereby enabling any subsequent "function" that might need access to the whole header to treat the fragments correctly. For example, the content of the L4 header (TCP, UDP, etc.) can be added as a payload extension to each fragment and used for fragment handling inside a node or controlled network, i.e., a network in which features other than or in addition to those required by IPv4 or IPv6 can be implemented. If such a node or network includes a number of packet-handling devices, it is easy to see the value of not having repeatedly to defragment and re-fragment datagrams inside the node/network. In such a node, it would be preferable only to have to defragment in the "end host" and perhaps in firewalls, but at the same time have all the L4 information at hand for each packet at each policy decision point. Other advantages of such a payload extension header are that nodes/networks that know how to use the extension can treat all packets, whether fragments or not, in the same way and that there is no need to buffer out-of-order non-initial fragments or to temporarily store state information about fragmented packages. Of course, to the extent that the payload extension header differs from the applicable standard protocol, all nodes and systems may not be capable of using it.

Figure 3:
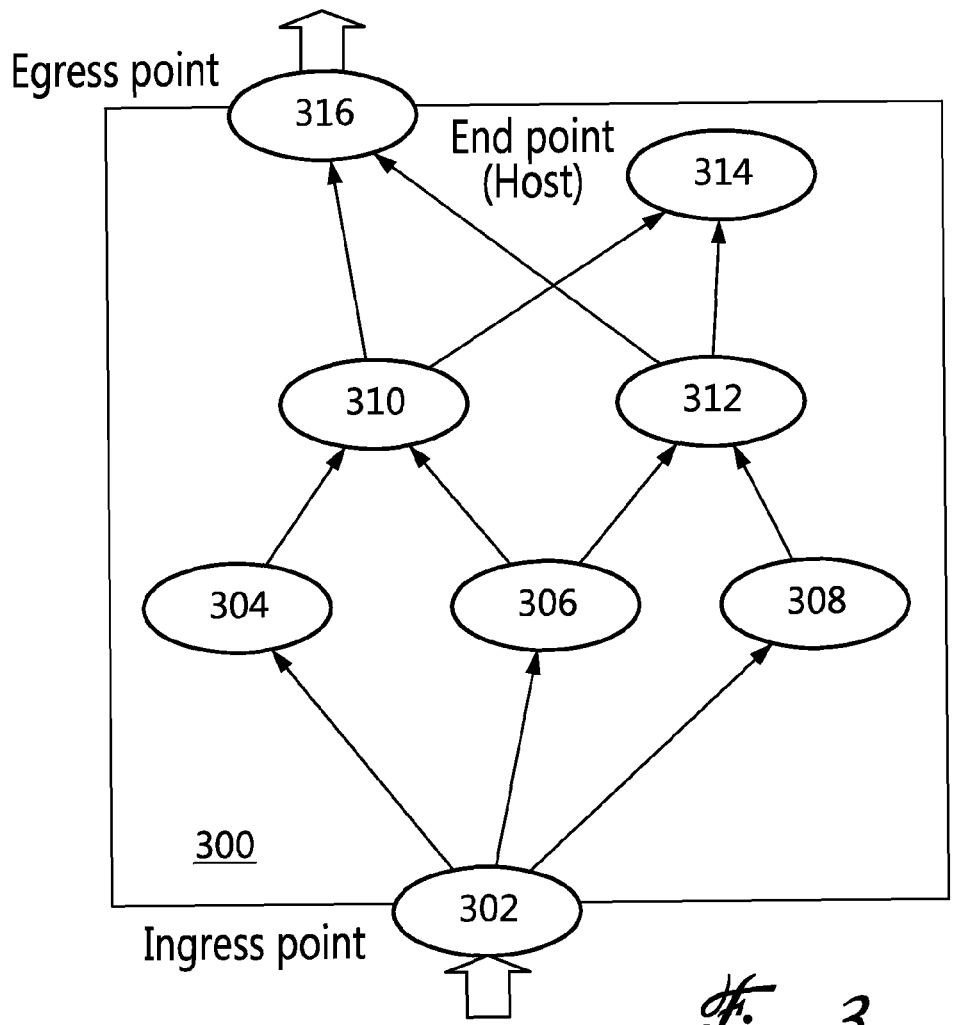
FIG. 3 depicts fragment routing through a network of nodes.

FIG. 3 depicts an exemplary IP network 300, comprising an ingress node 302, internal nodes 302, 304, 306, 308, 310, 312, 314, and an egress node 316. It will be appreciated that FIG. 3 is just an example used for explanation and that actual networks can use other arrangements. Further assume that node 314 is an end point, or host, for datagram fragments entering the network at node 302, the ingress point; that nodes 302-316 provide services; and that packet routing toward and between the nodes 302-316 uses more information than is included in the basic IP "2-tuple", i.e., the Destination and Source Ports. Each non-initial fragment thus contains too little information to route that fragment. Most normal ACL solutions are used for filtering and access control and not for processing, with some solutions blocking initial fragments and letting non-initial fragments through, which results in those packets being discarded at reassembly.

Figure 4:
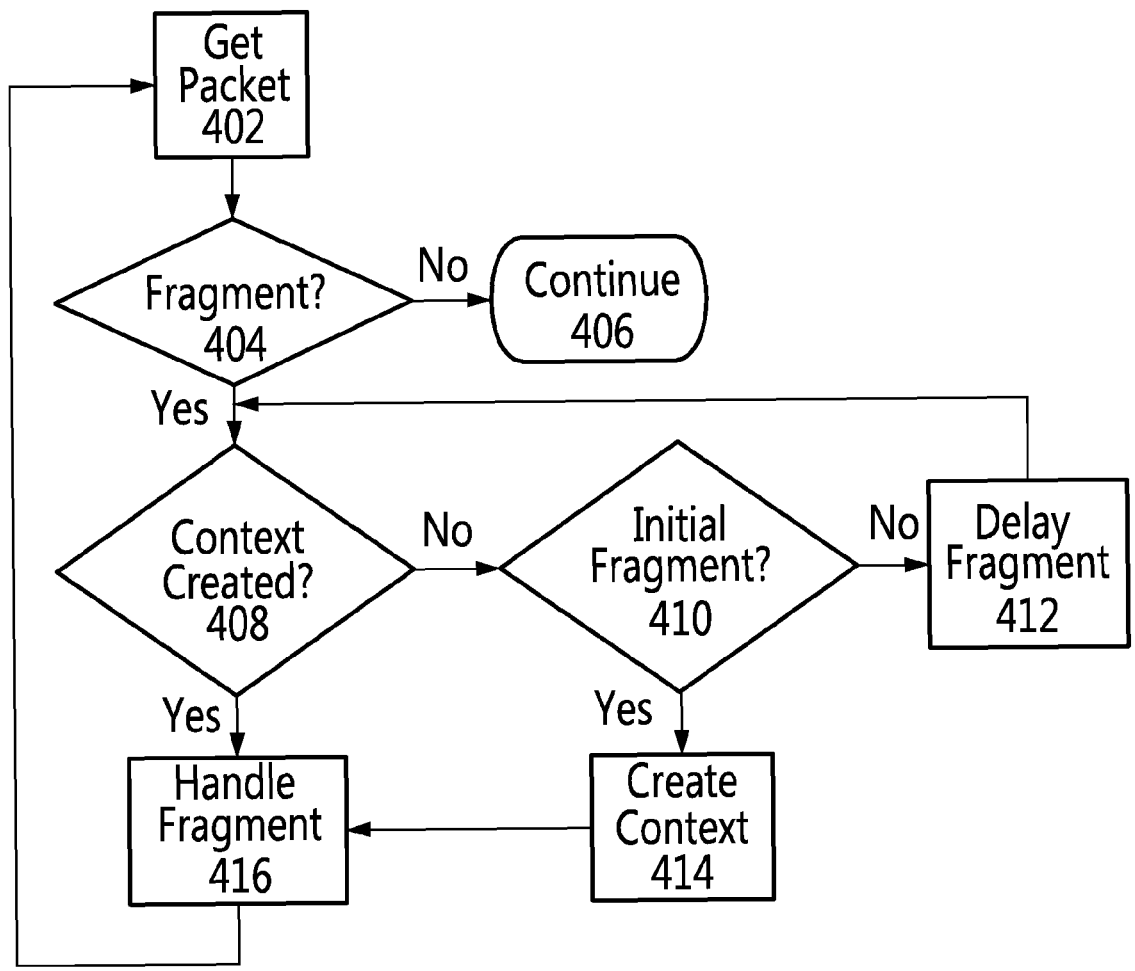
FIG. 4 is a flow chart that illustrates a method of fragment handling.

The ingress node 302 advantageously handles datagram fragments as described above. FIG. 4 is a flow chart that illustrates a method of fragment handling. In step 402, the node 302 gets an incoming packet, and at step 404, the node determines whether the packet is a fragment based on information in the incoming packet's header. If the incoming packet is not a fragment (No in step 404), the node 302 continues by handling the packet as usual (step 406).

If the incoming packet is a fragment (Yes in step 404), the node determines whether a session context for the fragment exists (step 408) based on information in the packet's header. If a session context does not exist (No in step 408), the node 302 determines whether the incoming packet is the initial fragment of the datagram (step 410). If the incoming packet is not the initial fragment (No in step 410), the incoming packet is delayed (step 412), for example either by temporary storage in a buffer memory in the node 302 or elsewhere in the network 300 or simply by looping the packet back to other functions executing in the node 302. If a session context does not exist and the incoming packet is the initial fragment (Yes in step 410), a session context is created based on information in the initial fragment (step 414). The initial fragment is handled according to the session context (step 416). It will be appreciated that handling fragments according to the session context can involve reassembling, validating, and/or re-fragmenting the datagram as described in this application.

If the incoming packet is a fragment (Yes in step 404) and a session context for the fragment exists (Yes in step 408), the incoming packet is handled according to the session context (step 416). Non-initial fragments that have been delayed due to their arrival before the initial fragment are handled according to the session context after that context has been created.

Figure 5:
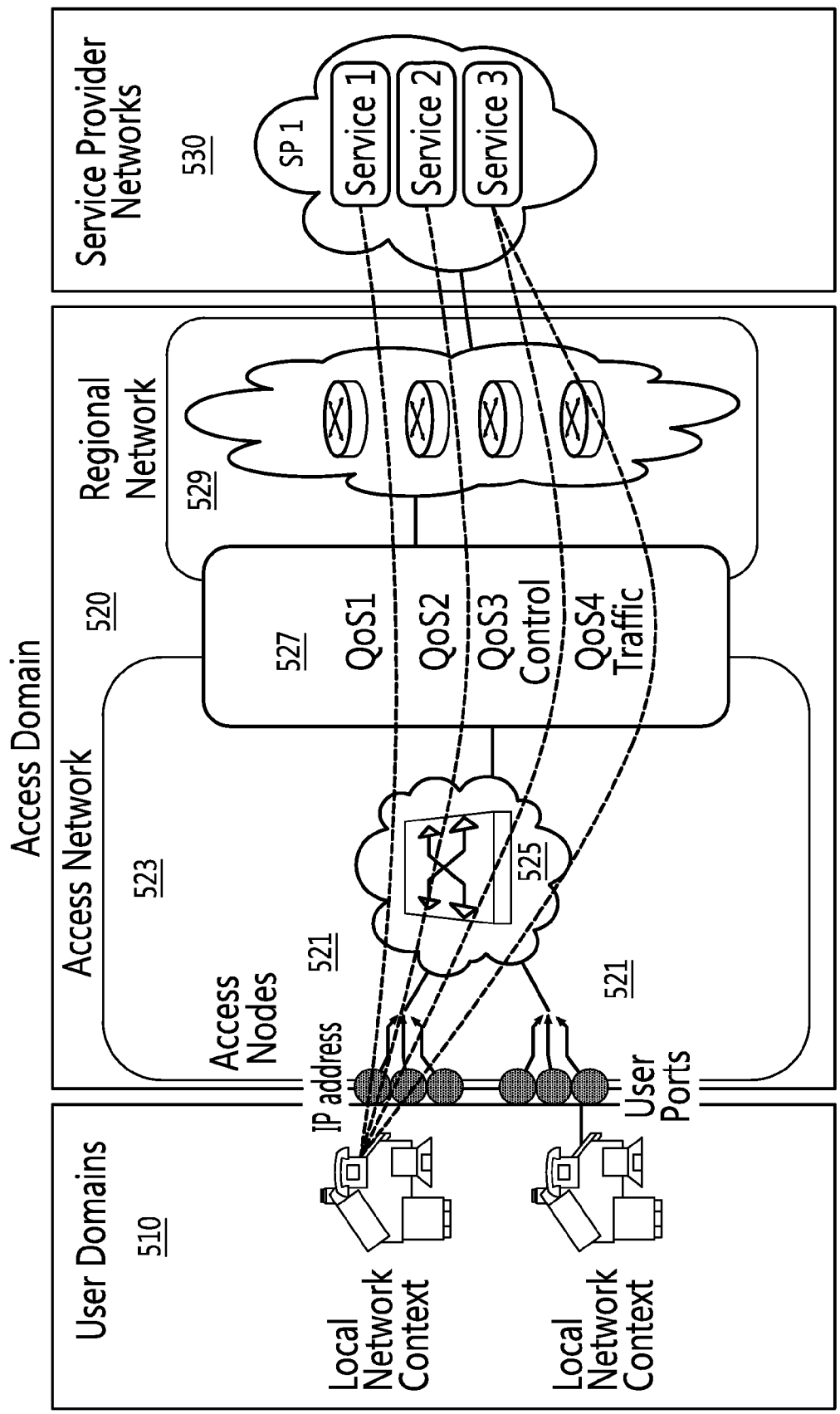
FIG. 5 depicts another example of an IP network providing fragment handling.

FIG. 5 depicts an example of an IP network 500 in which a user receives several services from a service provider. The network 500 includes user domains 510, an access domain 520, and a service provider domain 530. The access domain 520 includes a plurality of access nodes (AN) 521 in an access network 523, such as an IP network 300. The ANs 521 include gateways (not shown) and are network providers that offer access to the IP network 523 to user domains 510, which include for example user devices (UDs) (such as computers, mobile phones, personal digital assistants, etc.), local area networks (LANs), and wireless LANs. The user domains communicate with the ANs in various ways, e.g., telephone dial-up and digital subscriber line (DSL) connections, cable modems, and wireless communications, such as Wi-Fi, WiMax, and cellular telephony. The access network 523 includes a group of routers 525 that direct data traffic, i.e., IP packets, according to destination addresses in the packet headers to and from an access edge node 527 and a regional network 529 that also includes a plurality of routers. The service provider domain 530 includes one or more servers that provide for example voice-over-IP services, electronic banking, multimedia, and other services. In this description, the word "domain" refers to one or multiple network elements sharing similar functional features.

It will be appreciated that FIG. 5 is a greatly simplified depiction of an actual network 500, which typically includes a large number of user domains, access nodes, and service providers. The network 500 has several data networks communicating together, and thus the network 500 could be operated by several independent operators. To help ensure successful communication, data networks are usually explained and detailed using the Open System Interconnection (OSI) model, which is a networking framework for implementing protocols in seven layers. Those seven layers are 1) Physical, 2) Data Link, 3) Network, 4) Transport, 5) Session, 6) Presentation, and 7) Application. In the network 400, Layer 2 includes Ethernet and Asynchronous Transfer Mode protocols; Layer 3 includes IP; and Layers 4 and 5 include TCP and UDP.

The traffic management capabilities of the access network 523 and regional network 529 are coupled through the access edge node 527 such that end-to-end QoS characteristics can be maintained. Suitable access edge nodes 527 are described in U.S. Patent Application Publication No. US2006/0184645 by Monette et al. The access edge node creates, manages, and hosts service agents and service bindings that correspond to packet flows from the service provider domains 530 to the user domains 510.

A service binding (SB) is a binding between a user domain 510 and one of the service agents of the access edge node 527, and needs to be created in the access edge node 527 for a user, who can then receive a service, for example a Service 1, providing IP connectivity to the service provider. At this point, the user can also subscribe to additional services, e.g., Service 2 and Service 3, and in the node 527, the user's SB would show that the user has subscribed to three different services. With the SB created and services assigned, IP Service Flows are specified. In the example depicted in FIG. 5, four different QoS characteristics are required for the three services, and so four different IP Service Flows are needed: Flow1 specifying QoS1 for Service 1, Flow2 specifying QoS2 for Service 2, and Flow3 specifying QoS3 and Flow4 specifying QoS4 for Service 3.

An IP Service Flow and its associated characteristics are identified by specifying the user's IP address, a Service Provider's server IP address, and a protocol type. Thus, datagram fragments in such a Flow, other then the initial fragment, do not contain all of the information necessary for an IP Service Flow function to identify and treat data traffic based on packet inspection. In other words, the necessary information is contained only in the initial fragment, which is not necessarily the first packet to arrive at the node handling the IP Service Flow function, not in the other packets.

Because there is no guarantee that the fragments will be received in the correct order by an IP Service Flow function, the IP Service Flow function identifies all fragments, and then the fragments can be combined by a reassembly engine, which in its simplest form is a suitably programmed processor and memory, that buffers the fragments temporarily and reassembles a datagram from them if necessary according to a reassembly specification described in below. The reassembly engine has a specified buffer size, maximum buffering time, and maximum number of internal loops allowed for datagram re-assembly.

If the reassembly engine has a specified maximum buffering time of 0, received fragments are not buffered by the engine, but are immediately sent to an IP Service Flow Session function. An IP Service Flow Session is a name for an association between an IP Service Flow and a datagram or datagram fragments that is based on the ID, Source Address, Destination Address, and Protocol fields of the fragment headers. Those parameters can be used to identify related fragments and create the session context described above, for example in connection with FIGS. 3 and 4. The maximum number of internal loops refers to a maximum number of times each fragment can be processed by the IP Service Flow Session function. That configuration parameter is especially useful when the maximum buffering time is 0 and one or more already received fragments need to be processed repeatedly by the IP Service Flow Session function until the initial fragment of the datagram is received and an IP Service Flow Session is created.

When the buffering time is 0, the fragments are immediately returned to the forwarding function for processing, which is the IP Service Flow Session function, but when an IP Service Flow Session is not found, the fragment is sent again to the control plane for a buffering period of 0, where it will then be sent again to the IP Service Flow Session function. Thus, the fragments are "looped" until the arrival of the initial fragment, which has information sufficient to create a valid entry in the IP Service Flow Session table, after which all fragments can finally be processed successfully.

After the initial fragment is received, it is possible for an IP Service Flow Session to be created as described below. After the IP Service Flow Session is created, all pending and later-received fragments can be sent to the IP Service Flow Session function. In addition, an IP Flow Session can be created after all fragments are received and combined, and then the datagram can be fragmented again, possibly in a different way, and forwarded accordingly. It may be noted that the content of the re-assembled datagram might differ from the content of the initial fragment, as explained below concerning the Fragment Offset parameter. Complete re-assembly of the datagram from the fragments can be advantageous as it enables validation of the datagram, i.e., verification of the datagram's legitimacy, as described below.

In IPv4, it is not possible to verify the Fragment Offset field value until the complete datagram is re-assembled. In theory, all fragments should complement each other and never overlap, but in practice, IPv4 does not forbid different arrangements, which lets packet senders modify the Fragment Offset parameter in order to overwrite information contained in other fragments. Such overwriting can occur when re-assembly is done without explicit checks for such a trick. Due to possible fragmentation overlap, it is only when a complete datagram is re-assembled that the IP Service Flow function can be sure to treat the fragments properly, i.e., according to the initial fragment in the re-assembled datagram. It might be advantageous to re-fragment the re-assembled datagram before forwarding it to the IP Service Flow Session function, especially if some received fragments overlap.

It will be understood that in this example of an IP Service Flow, the IP Service Flow function is used for non-fragmented datagrams and the IP Service Flow Session function is used for fragmented ones. Typically, the only difference between the functions is the identifier of the Service Flow, not the result. Thus, a datagram fragment ends up with the same processing as it would have had if it had not been a fragment.

The IP Service Flow Session is removed when all related fragments have passed the IP Service Flow Session function. The mechanism for removal of the Session can be based on time or on the detection that all fragments have been forwarded successfully.

As noted above, the IP Service Flow Session function performs the same tasks as the IP Service Flow function for non-fragmented datagrams, except that it is accessed with a different session identifier that is suited only for fragments. If the Fragmented Packet Validation function described above is not used, the session identifier can simply be the ID, Source Address, Destination Address, and Protocol parameters, i.e., the same identifiers as the IP Service Flow. That session identifier can also be used in the case where the re-assembled datagram was re-fragmented locally, assuring the validity of the fragments. If the reassembled datagram is not re-fragmented locally, it can be more appropriate to use a system-internal session identifier to process all the fragments equally in the IP Service Flow Session function. If a session identifier is not found in the IP Service Flow Session function, that fragment is delayed, for example by sending it once again to the reassembly engine, as described above.

Figure 6:
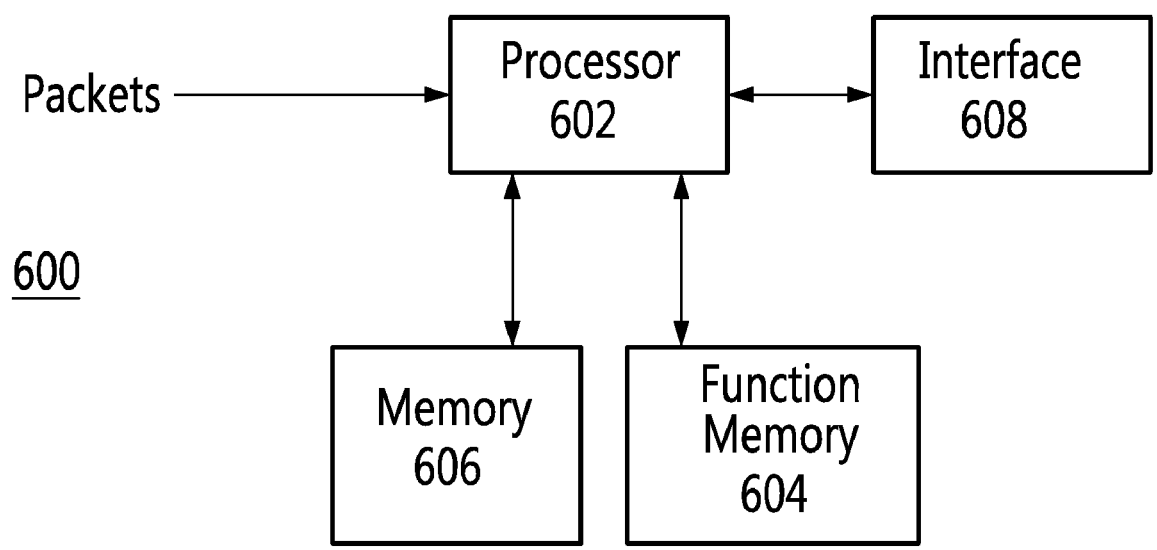
FIG. 6 is a block diagram of an apparatus for fragment handling.

FIG. 6 is a block diagram of an apparatus 600 for handling datagram fragments as described above. It will be appreciated that the arrangement depicted in FIG. 6 is just one example of many possible devices that can implement the methods described in this application. The equipment 600 includes a programmable electronic processor 602, which may include one or more sub-processors, and which executes one or more software applications, modules, and functions to carry out the methods of fragment handling described in this application. Incoming packets arrive at the apparatus 600, and the processor 602 handles those packets according to the methods described above. Software functions executed by the processor 602 may be stored in a suitable function memory 604, and the apparatus may also temporarily store and/or cache desired information in a suitable memory 606. The apparatus 600 also typically includes a suitable interface 608 that can be used to connect other components, such as other nodes in a network or other devices in a node, to the apparatus 600.

Fragmentation of an IP datagram can be necessary in various circumstances. For example in sending, the datagram can be larger than the Maximum Transmission Unit (MTU) that a network can pass between the sender and the destination. This occurs frequently for many UDP-based protocols, such as the Network File System (NFS) for which the maximum packet size is about 65 K bytes and a common MTU is about 1500 bytes, in both for IPv4 and IPv6. As another example in IPv4, an intermediate node that needs to send a datagram on a link permitting only smaller MTUs has to break apart the datagram, which can get complicated since it can break up already fragmented packets.

This invention enables such fragments to be processed by a function that applies deep packet inspection in order to identify the required processing related to packet classification, conditioning, metering, and scheduling. This invention also enables fragments to be validated before reaching their destination, providing a security function potentially protecting the destination device against badly constructed fragments. It will be understood that such validation involves making sure that all fragments of a datagram are routed, or forwarded, through the same path and get the same treatment. If non-initial fragments are not marked, they will be matched by only policies that only include L2 and L3 information. The fact that a datagram is logically reassembled ensures that no "weird" fragments (i.e., fabricated, malicious, or erroneous fragments) get handled by the wrong policies and therefore receive the wrong treatment.

It is expected that this invention can be implemented in a wide variety of environments, including for example mobile communication devices. It will be appreciated that procedures described above are carried out repetitively as necessary. To facilitate understanding, many aspects of the invention are described in terms of sequences of actions that can be performed by, for example, elements of a programmable computer system. It will be recognized that various actions could be performed by specialized circuits (e.g., discrete logic gates interconnected to perform a specialized function or application-specific integrated circuits), by program instructions executed by one or more processors, or by a combination of both. Many communication devices can easily carry out the computations and determinations described here with their programmable processors and associated memories and application-specific integrated circuits.

Moreover, the invention described here can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "computer-readable medium" can be any means that can contain, store, communicate, propagate, or transport the program for use by or in connection with the instruction-execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium include an electrical connection having one or more wires, a portable computer diskette, a RAM, a ROM, an erasable programmable read-only memory (EPROM or Flash memory), and an optical fiber.

Thus, the invention may be embodied in many different forms, not all of which are described above, and all such forms are contemplated to be within the scope of the invention. For each of the various aspects of the invention, any such form may be referred to as "logic configured to" perform a described action, or alternatively as "logic that" performs a described action.

It is emphasized that the terms "comprises" and "comprising", when used in this application, specify the presence of stated features, integers, steps, or components and do not preclude the presence or addition of one or more other features, integers, steps, components, or groups thereof.

The particular embodiments described above are merely illustrative and should not be considered restrictive in any way. The scope of the invention is determined by the following claims, and all variations and equivalents that fall within the range of the claims are intended to be embraced therein.

The invention claimed is:

1. A method of handling, in an ingress node of an IP network, datagram fragments in a stream of packets, the method comprising the steps of:
   receiving a packet incoming at the ingress node;
   determining at the ingress node whether the packet is a fragment based on information in the packet's header;
   if the packet is a fragment, determining at the ingress node whether a session context for the fragment exists based on information in the packet's header;
      if the session context does not exist, determining at the ingress node whether the packet is an initial fragment of a datagram;
         if the packet is an initial fragment, creating at the ingress node a session context for the packet and other fragments based on information in the packet, and handling the packet according to the session context;
         if the packet is not an initial fragment, delaying at the ingress node the packet at least until the session context has been created; and
      if the session context exists, handling at the ingress node the packet according to the session context;
   wherein a delayed packet is handled at the ingress node according to the session context after the session context has been created.

2. The method of claim 1, further comprising the step of repeating the steps for each a plurality of successive packets.

3. The method of claim 2, further comprising the step of reassembling a datagram from successive packets.

4. The method of claim 3, further comprising the step of validating the datagram.

5. The method of claim 3, further comprising the step of re-fragmenting the datagram.

6. The method of claim 1, wherein handling at the ingress node the packet according to the session context comprises one or more steps of buffering, delaying, filtering, inspecting, mirroring or discarding the packet at the ingress node, or forwarding the packet to another node.

7. An apparatus for handling datagram fragments in a stream of packets, comprising:
   an interface configured to connect to nodes of a network and to receive a packet from the network; and
   an electronic processor configured to determine whether the packet received at the interface is a fragment of a datagram, based on information in the packet's header; to determine, if the packet is a fragment, whether a session context for the fragment exists based on information in the packet's header; to determine, if the session context does not exist, whether the packet is an initial fragment; to create, if the packet is an initial fragment, a session context for the packet and other fragments based on information in the packet; to delay the packet if the packet is not an initial fragment at least until the session context has been created; and to handle the packet according to the session context;
   wherein the processor is configured to handle a delayed packet according to the session context after the session context has been created.

8. The apparatus of claim 7, wherein the processor is further configured to handle a plurality of successive packets.

9. The apparatus of claim 8, wherein the processor is further configured to reassemble a datagram from successive packets.

10. The apparatus of claim 9, wherein the processor is further configured to validate the datagram.

11. The apparatus of claim 9, wherein the processor is further configured to re-fragment the datagram.

12. The apparatus of claim 7, further comprising a memory in communication with the processor, wherein the processor is configured to delay a packet by temporarily storing the packet in the memory.

13. A non-transitory computer-readable medium having stored instructions that, when executed by an ingress node of an IP network, cause the ingress node to perform a method of handling datagram fragments in a stream of packets, wherein the method comprises the steps of: determining whether an incoming packet received at the ingress node is a fragment based on information in the packet's header; if the packet is a fragment, determining whether a session context for the fragment exists based on information in the packet's header; if the session context does not exist, determining whether the packet is an initial fragment of a datagram; if the packet is an initial fragment, creating a session context for the packet and other fragments based on information in the packet, and handling the packet according to the session context; if the packet is not an initial fragment, delaying the packet at least until the session context has been created; and if the session context exists, handling the packet according to the session context; wherein a delayed packet is handled according to the session context after the session context has been created.

14. The medium of claim 13, wherein the method further comprises the step of repeating the steps for each a plurality of successive packets.

15. The medium of claim 14, wherein the method further comprises the step of reassembling a datagram from successive packets.

16. The medium of claim 15, wherein the method further comprises the step of validating the datagram.

17. The medium of claim 15, wherein the method further comprises the step of re-fragmenting the datagram.

18. The medium of claim 13, handling at the ingress node the packet according to the session context comprises one or more steps of buffering, delaying, filtering, inspecting, mirroring or discarding the packet at the ingress node, or forwarding the packet to another node.

* * * * *